United States Patent
Nicholas

(12) 
(10) Patent No.: US 6,567,463 B1
(45) Date of Patent: May 20, 2003

(54) METHOD AND SYSTEM FOR DETECTING ANALOG AND ADPCM LINKS IN A COMMUNICATION CHANNEL

(75) Inventor: Michael G. Nicholas, Wheeling, IL (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/087,153

(22) Filed: May 29, 1998

(51) Int. Cl.⁷ .................................. H04L 5/16

(52) U.S. Cl. .................. 375/222; 375/228; 379/93; 370/252; 455/115; 455/226.1

(58) Field of Search .................. 375/222, 224, 375/226, 228, 242; 379/93, 96, 97, 98; 370/252, 253; 455/115, 226.1, 226.2

(56) References Cited

U.S. PATENT DOCUMENTS

| | | | | |
|---|---|---|---|---|
| 4,250,458 A | * | 2/1981 | Richmond et al. ............ | 329/112 |
| 5,311,578 A | * | 5/1994 | Bremer et al. ................ | 379/97 |
| 5,349,635 A | * | 9/1994 | Scott ........................... | 379/97 |
| 5,446,771 A | * | 8/1995 | Lin .............................. | 375/224 |
| 5,528,679 A | * | 6/1996 | Taarud ......................... | 379/34 |
| 5,721,547 A | | 2/1998 | Longo ......................... | 341/118 |
| 5,787,116 A | * | 7/1998 | Lam et al. .................... | 375/222 |
| 5,844,940 A | * | 12/1998 | Goodson et al. ............. | 375/222 |
| 6,075,620 A | * | 6/2000 | Yoshida et al. .............. | 358/434 |
| 6,081,556 A | * | 6/2000 | Holmquist .................... | 375/242 |
| 6,088,334 A | * | 7/2000 | Davenport et al. ........... | 370/252 |
| 6,301,296 B1 | * | 10/2001 | Krishnan et al. ............. | 375/222 |

OTHER PUBLICATIONS

H. Dispatch, ed., "V.140 (ex H.Dispatch) As Decided by SG16", Apr. 6, 1998 (37 pages).

"Proposed Startup Sequence for the v.pcm All–digital Mode", V.–pcm Rapporteur Meeting, Lake Buena Vista, Florida, U.S.A., Dec. 1997 (7 pages).

* cited by examiner

Primary Examiner—Stephen Chin
Assistant Examiner—Dac V. Ha
(74) Attorney, Agent, or Firm—McDonnell Boehnen Hulbert & Berghoff

(57) ABSTRACT

A method and system for detecting analog and Adaptive Differential Pulse Code Modulation ("ADPCM") communication links in a communication channel is described. On an illustrative embodiment, the method include the steps of transmitting a signal with a D.C. offset value across the communication channel, receiving the transmitted signal from the communication channel and detecting the D.C. offset value in the received signal. If the D.C. offset value is detected, the communication channel is determined to be a digital end-to-end connection. If the D.C. offset value is not detected in the received signal, the communication channel includes analog or ADPCM connection links and is not suitable for all-digital communications. In illustrative embodiment, the device includes a transmitter capable of transmitting an offset transmit signal, a receiver capable of receiving the transmitted signal and logic capable of detecting an offset signal. The logic may include an integrator to receive the transmitted signal, an absolute value circuit to determine the absolute value of the integrator output, and a comparator to compare the absolute value of the integrator output to a threshold value. If the absolute value of the transmitted signal is greater than a threshold value, the offset is detected indicating the presence of a digital end-to-end transmission channel. If the absolute value of the integrator is less than a threshold value, the D.C. offset is not detected indicating the presence of an analog link in the transmission channel.

37 Claims, 4 Drawing Sheets

METHOD AND SYSTEM FOR DETECTING ANALOG AND ADPCM LINKS IN A COMMUNICATION CHANNEL

FIELD OF INVENTION

This invention generally relates to techniques for testing and detecting the characteristics of a communication channel. More specifically, it relates to a method and system for detecting digital end-to-end transmission links.

BACKGROUND OF THE INVENTION

A computer user may access a computer network from a remote location by establishing a modem connection over a communication network such as the public switched telephone network ("PSTN") or other private networks. The computer modem uses the network connection to allow the remote computer user to communicate with the network using a communication protocol such as the ITU-T defined V.34 or V.90 protocol standards. The V.34, V.90, and most other modem communication protocols are designed to allow digital computer information to be transmitted over an analog communication channel.

Today, an increasing number of digital network connections such as ISDN or T1/E1 are becoming more widely available. In fact, digital end-to-end connections from a caller to a computer network may soon become common place. Computer modems, however, have traditionally been designed to allow digital computers to communicate with a computer network over analog communication channels by modulating the digital signals into a format suitable for transmission over the analog channel. With the advent of all-digital end-to-end communication links, computer modems may also include a digital communication mode that eliminates the conversion of digital signals to a modulation suitable for transmission over an analog communication link and the resulting re-conversion of the analog modulation back to digital signal by the receiver.

A problem with implementing a modem having a digital communication mode is detecting when the modem has a completely digital end-to-end communication link and is thus suitable for communication using a digital mode. To use the digital mode, the modem must know whether it is communicating over a digital end-to-end communication link or whether the transmission channel may have an intervening analog connection.

Methods for detecting digital end-to-end communication links have been proposed. For example, a method has been proposed that simply assumes the transmission channel includes only digital links and begins a line probing sequence over the connection as if it were a completely digital connection. The line probing sequence involves sending a sequence of pulse code modulation ("PCM") codes over the communication link. The response of the transmission channel to these PCM codes can be used to determine if the connection is formed entirely by digital communication links. For example, the sequence of PCM codes may contain a large component at the 4 KHz frequency that may not be received because an intervening analog link is present. If the digital line probing sequence fails, the modem initiates an analog communication protocol. A further description of such a line probing sequence is discussed in "Proposed Startup Sequence for the v.pcm All-Digital Mode" ITU-Telecommunication Standards Sector publication PCM'97-174, Study Group 16—Question 23, by Jim Renkel.

One problem with the proposed digital mode is that if the connection includes analog or adaptive differential PCM links, the digital mode fails and the analog communication protocol must then be initiated. Like analog lines, ADPCM lines are also of insufficient quality for carrying digital communications. A substantial amount of connection time is wasted in attempting to set up digital communications and failing and a further delay is then incurred in setting up the analog communication protocol. While there are other methods of characterizing a transmission channel they may not work properly with voice grade links which may have echo cancellers and digital attenuation pads. Thus, a method and system is needed for detecting completely digital end-to-end communication links.

SUMMARY OF THE INVENTION

In accordance with an illustrative embodiment of the present invention, problems associated with the detection of end-to-end digital transmission channels are addressed. The present embodiment provides a method and device for detecting the presence of end-to-end digital communication links that are free of any intervening analog or ADPCM connection links.

In an illustrative embodiment, a method of detecting an end-to-end digital connection is described. The method includes the steps of transmitting a signal with a D.C. offset value across the communication channel, receiving the transmitted signal from the communication channel and detecting the D.C. offset value in the received signal. If the D.C. offset value is detected, the communication channel is determined to be a digital end-to-end connection. If the D.C. offset value is not detected in the received signal, the transmission channel includes analog or ADPCM connection links and is not suitable for digital communications.

In another embodiment of the invention, the described method includes the steps of adding an offset value to a signal and transmitting a transmitted signal comprising the offset value and the signal. Preferably, the offset value is a constant value. The method may also include the steps of receiving the transmitted signal as a received signal and detecting the offset value in the received signal. The detection of the offset value in the received signal indicates an end-to-end digital communication link. The absence of the offset value in the received signal indicates the presence of an analog transmission link in the connection.

In another aspect of the invention, an illustrative embodiment of a communication device for detecting digital connections is described. The device includes an adder for adding an offset value to a signal to form a transmit signal and a transmitter for transmitting the transmit signal across a transmission channel to a receiving communication device. The transmission channel may include a digital end-to-end connection or a connection that includes both digital and analog connection links. If the transmission channel includes only digital communication links, the added offset value will be present in the signal received at the receiving communication device.

Alternatively, in another aspect of the invention, an embodiment of the device includes a transmitter capable of transmitting an offset transmit signal, a receiver capable of receiving the transmitted signal and logic capable of detecting an offset signal. The logic may include an integrator to receive the transmitted signal, an absolute value circuit to determine the absolute value of the integrator output, and a comparator to compare the absolute value of the integrator output to a threshold value. If the absolute value of the transmitted signal is greater than a threshold value, the offset is detected indicating the presence of a digital end-to-end transmission channel. If the absolute value of the integrator is less than a threshold value, the D.C. offset is not detected indicating the presence of an analog link in the transmission channel.

In an embodiment of the invention, executable software code and a computer system with memory is used to implement the described embodiment. Alternatively, dedicated hardware, discrete logic, programmable logic devices ("PLD"), application specific integrated circuits ("ASIC") may be used to implement the described embodiment.

Using the described embodiments to determine the presence of digital end-to-end communication links provides several advantages. For example, the described embodiment allows modems to determine the characteristics of a transmission channel before initializing communications. The modems may detect the presence of a digital end-to-end transmission channel and establish a high-speed digital communication protocol over the channel. Transmission channels with analog links can also be detected prior to establishing communications over the link, therefore avoiding wasting time attempting to establish a digital communication protocol or falling back to an analog communication mode.

The foregoing and other features and advantages of an illustrative embodiment of the present invention will be more readily apparent from the following detailed description, which proceeds with references to the accompanying drawings.

DETAILED DESCRIPTION OF AN ILLUSTRATIVE EMBODIMENT

Figure 1:
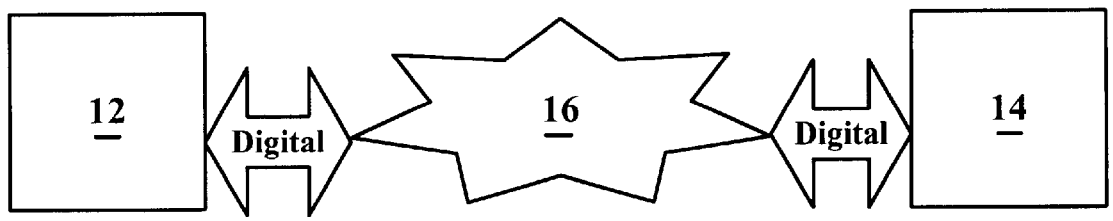
FIG. 1 shows a system with a modem connection capable of utilizing an embodiment of the present invention.

FIG. 1 is a block diagram of a system 10 capable of utilizing an illustrative embodiment of the invention. The connection devices 12, 14 are preferably modems but may be any communication device capable of communicating digital information and having digital connectivity to the communication network 16. In this illustrative embodiment, the communication devices 12, 14 may be generally referred to as modems, preferably capable of both analog and digital communication modes. The first or calling modem 12 is connected to communicate with a second or answering modem 14 through the communication network 16. In an analog communication mode, the modems 12, 14 may utilize the ITU-T V.34 or V.34 bis protocol to communicate at data rates up to 33.6 Kbps and ITU-T V.90 to communicate at data rates up to approximately 56 Kbps over common telephone lines. In a digital communication mode that can be used to communicate over an end-to-end digital connection, the modems 12, 14 may implement a digital V.90 "All Digital Mode" as defined and currently being proposed by communication standards committee. Current ITU-T V.90 protocol specifications are asymmetric, allowing PCM data rates up to about 56 Kbps in one direction, while the other direction is limited to analog V.34 modulation to 33.6 Kbps. The V.90 "All Digital Mode" used in conjunction with the current embodiment can identify all-digital connections allowing higher speed PCM communication in both directions. Ideally, a digital communication mode using a typical all-digital network connection allows communication at up to 64 Kbps.

The communication network 16 may take many forms, but will generally be referred to herein as the Public Switched Network ("PSTN") or General Switched Telephone Network ("GSTN"). The GSTN is any of the networks, usually carrying telephony voice and modulated digital computer data, provided by the Regional Bell Operating Companies, AT&T, GTE, and other communication networks comprising multiple switching offices. The communication network 16 may also include a computer data network such as the public Internet, a token ring or packet network, Ethernet, asynchronous transfer mode ("ATM"), Frame Relay, TCP/IP, SONET or any private communication network, or intranet. Preferably the calling modem 12 is connected to the network with a digital connection such as provided by an integrated services digital network ("ISDN") Primary Rate Interface ("PRI") or Basic Rate Interface ("BRI") which may be carried by high capacity time-division multiplexed connections such as a T1 or E1 connections. The network 16 typically forms a circuit-switched transmission channel that allows the communication between the modems 12, 14. The transmission or communication channel can take various forms and be made of a plurality of connection links across the communication network 16.

Figure 2:
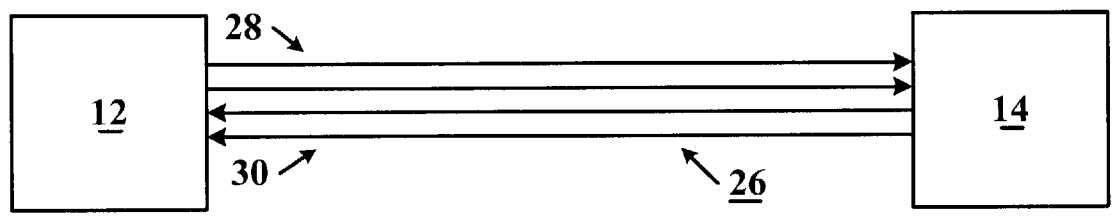
FIGS. 2 and 3 are diagrams showing digital and analog communication links, respectively, of the system depicted in FIG. 1.
Figure 3:
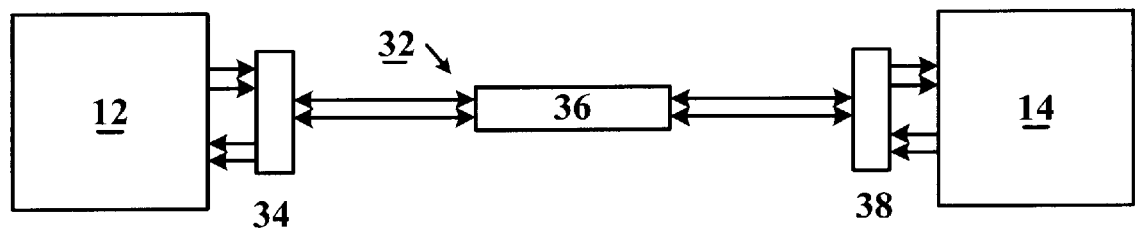

Referring now to FIGS. 2 and 3, communication connection links are primarily either digital connection links, ADPCM, or analog connection links as well known to those skilled in the art. Typically, digital communication links 26 shown in FIG. 2 are capable of directly transmitting digital data while analog communication links cannot transmit digital data without conversion to a suitable analog signal. The digital communication link 26 typically uses a 4-wire circuit to carry digital data between the calling modem 12 and answering modem 14. The digital 4-wire circuit typically includes a separate transmit wire pair 28 and a receive pair 30 and may implement a variety of digital communication interfaces. ADPCM links are digital connections but for the purposes of this discussion are treated similar to analog connections links as will be described below.

Referring to FIG. 3, the analog connection link 32 includes a single wire pair 32 carrying data in both directions to communication devices 12, 14. To communicate over the analog communication link 32 the communication devices 12, 14 are connected to a digital-to-analog converter ("DAC") 34 to convert the digital signals to analog signals. At the receiving end of the analog communication link 32, an analog-to-digital converter ("ADC") 38 receives the signals and converts the analog signal level to the corresponding digital value. The analog communication link 32 also necessarily include a number of hybrid amplifiers, filtering, echo cancellers and other analog devices in the communication path that may introduce transformer or capacitor coupling 36 to the transmission line. Such coupling 36 will block and prevent D.C. voltages from being transmitted across the analog communication link 32 and reaching the receiving ADC 38. Thus, ADC 38 does not receive the D.C. component of signals transmitted across the analog communication line 32. Similar to analog connection links, ADPCM communication links also prevent D.C. voltages from being transmitted and received by the ADC 38. ADPCM communication links typically include a high-pass filter that block low frequency signals below approximately 50 Hz, such as D.C. signals. ADPCM communication links also encode signals differentially, which does not capture D.C. signals. For the purposes of this discussion, references to analog connection links will include ADPCM connection links.

In an illustrative embodiment, the devices 12, 14 may utilize the ITU-T defined V.8 or V.8 bis protocols for negotiating the ITU-T V.34 communication protocol which is well known to those skilled in the art. Upon the calling communication device 12 initiating and establishing a communication channel through the communication network 16 to the answering communication device 14, the answering device 14 responds by transmitting a modified answer tone or ANSam. A training or negotiation process between the devices 12, 14 is then initiated to determine the characteristics and capabilities of the transmission line and agree on a set of connection features, modulation, and options between the devices. An example, of a line probing call negotiation sequence suitable for used with the present invention is described in U.S. Pat. No. 6,088,334, entitled "System and Method for Determining End-to-End Characteristics of Data Communication Channel" which is hereby incorporated by reference.

Figure 4:
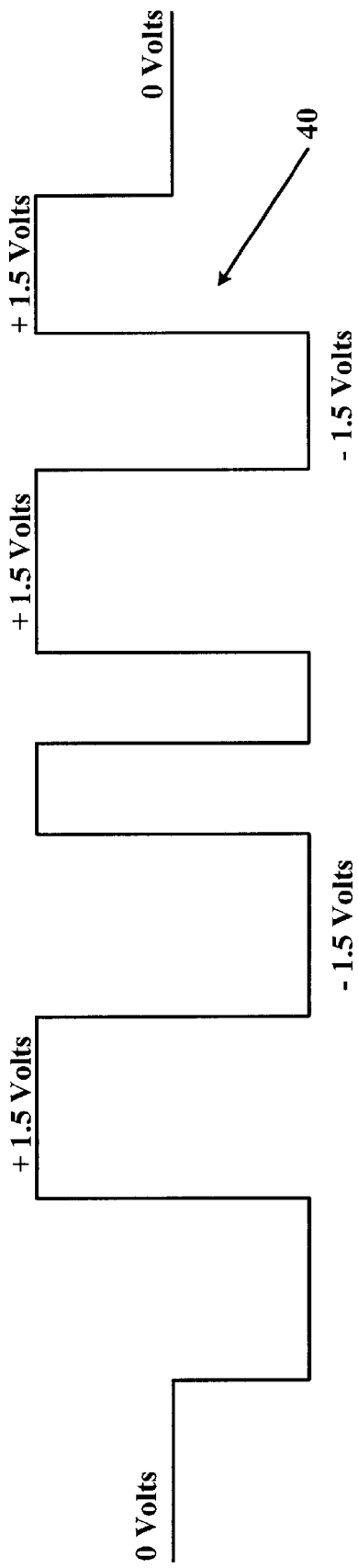
FIGS. 4 and 5 show signal waveforms with and without, a D.C. offset component.
Figure 5:
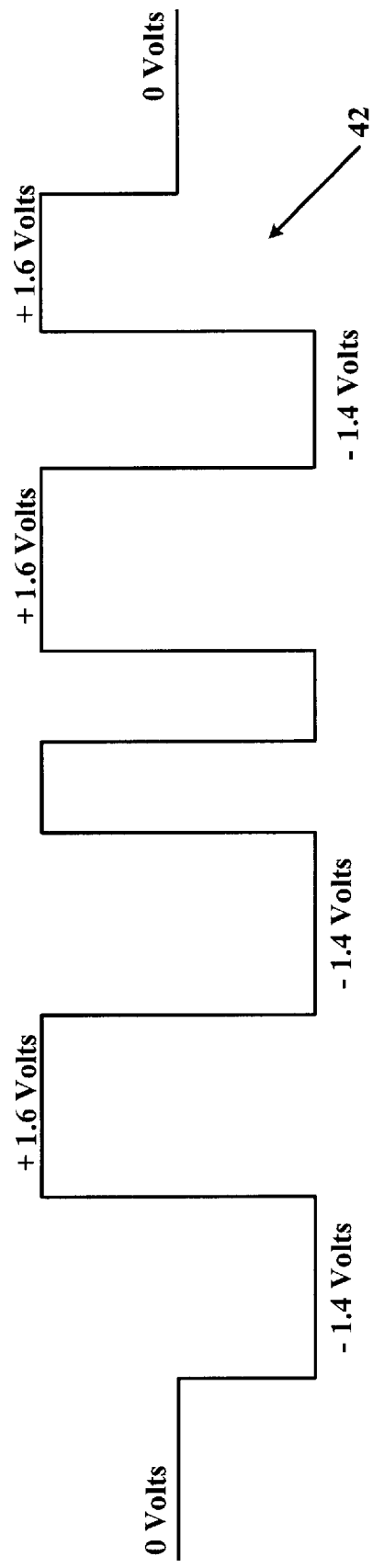

In the illustrative embodiment, transmitted line probing signals sent between the communication devices 12, 14 during call may include signals having a D.C. offset value. The transmitted signal may be analog signal waveforms with a D.C. component. FIGS. 4 and 5 show exemplary signal waveforms without and with a D.C. offset component. It should be understood that the particular waveforms and amplitude voltages shown are simply for purposes of explanation. Actual signal waveforms and amplitude voltages will vary of course with the particular communication devices and transmission system utilized. In FIG. 4, shown is a signal waveform 40 with a maximum peak-to-peak voltage amplitude of +/−1.5 volts. The signal waveform 40 has no D.C. component and is thus symmetric about zero volts. As shown in FIG. 4, the signal waveform 40 has peaks at +1.5 volts and −1.5 volts.

Shown in FIG. 5 is a similar exemplary waveform 42 with a 0.1-volt D.C. offset component. The signal waveform 42 still exhibits a 3-volt peak-to-peak voltage amplitude, but is no longer symmetric about zero volts because of the 0.1-volt offset component. As seen in FIG. 5, the signal waveform voltages are shifted upward by the D.C. offset voltage. Thus, the waveform with the D.C. offset is no longer symmetric about 0 volts. The peaks of the D.C. offset waveform are at +1.6 volts and −1.4 volts. The described D.C. waveforms can be used in the present embodiment for detecting the presence of analog communication links in a transmission channel.

Figure 6:
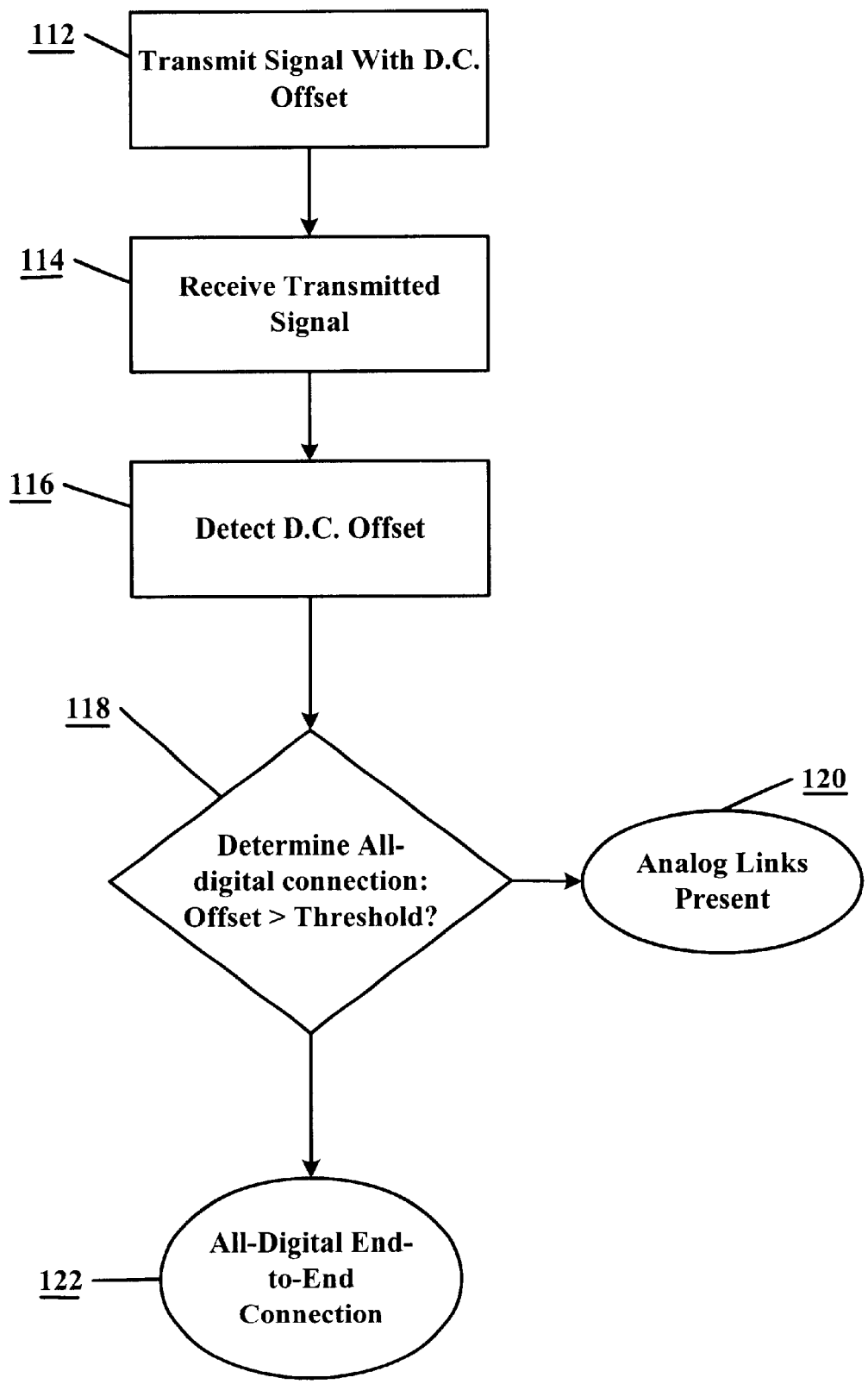
FIG. 6 shows a flow chart of an illustrative method according to an aspect of the invention.

FIG. 6 shows a flow chart of an illustrative method 110 using a signal with a D.C. offset component to determine whether a transmission channel is a digital end-to-end connection or whether the transmission channel utilizes an analog connection link.

At step 112, the communication device transmits a signal with a D.C. offset component. In this illustrative embodiment, the D.C. offset may be added to signals transmitted across the transmission channel, such as V.8 signals transmitted as part of the communications training protocol. The transmit signal with a D.C. offset can be generated in a number of ways well known to those skilled in the art. Preferably, the D.C. offset value is added as a constant value to data samples before they are encoded as PCM values. The constant value will differ according to the amount of D.C. offset desired. In addition, the D.C. offset can also be added to a PCM encoded signal by adding a fixed PCM value corresponding to the desired D.C. offset.

The D.C. offset value can be chosen according to the network environment. For example, the D.C. offset value should be large enough such that it can be distinguished from random noise, but small enough so that the transmitted signal does not exceed regulated power levels, clip or otherwise distort analog signals such as V.8 Call Menu or V.8 Joint Menu. V.8 protocols are explained in more detail in ITU-T V.8 specification, which is hereby incorporated by reference.

At step 114, the transmitted signal is received at an answering communication device at the receiving end of the transmission channel. The answering modem receives the transmitted signal as a received signal waveform corresponding to the transmitted waveform, except for the effects on the signal due to network impairments well known to those of skill in the art. Network impairments may include for example Digital Pads, Sign Inversion, Robbed Bits, Zero code suppression, etc.

At step 116, the received signal waveform is analyzed to detect a D.C. offset component. Every decompressed PCM sample or subset of the decompressed PCM samples are added to the integrator. In an illustrative embodiment a 32-bit integrator may monitor the output of the PCM decoder. Preferably, the integrator has appropriate resolution to detect the D.C. offset and not overflow if the offset is present in every sample received during the integration period. Preferably, the integrator may be zeroed at the beginning of V.8 negotiation and checked before the silent period following the V.8 CJ and JM signals.

At step 118, the determination is made whether the transmission channel contains any analog communication links or whether the connection is an all-digital end-to-end connection. For example, if a D.C. offset is present it can be determined that an analog communication link was not present in the transmission channel and that the connection is a digital end-to-end connection. The presence of the D.C. offset can be determined in a variety of ways, well known to those skilled in the art. In an illustrative embodiment, the integrator can be used to integrate the received waveform over an integration period. Preferably, the integration period is long enough to detect the presence of the D.C. offset. The integration time period can be determined by those of skill in the art according to the lengths of ANSam plus Joint Menu of the answering modem, and the length of Call Menu of the originating modem. After the integration period, the absolute value of the integrator is compared to a threshold level. If the absolute value of the integrator output exceeds the threshold level, a D.C. offset is present in the received signal. With all-digital connection links the integrator output corresponds to the amount of D.C. offset and the length of the integration time period. It should be understood that the detection of the D.C. offset can be implemented a number of different ways by those skilled in the art and may vary widely from implementation to implementation. The time periods, number of samples, and numerous other variations are all possible.

The presence of the D.C. offset in the received signal indicates that analog transmission links with transformer or capacitive coupling are not present in the transmission channel. Thus, the transmission channel is determined to be a digital end-to-end connection at step 122.

At step 120, if the absolute value of the integrator is less than the threshold, a D.C offset is not present in the received signal. It can then be determined that an analog link is present in the transmission channel and the channel is thus not suitable for digital communications.

The values of the D.C. offset, the integration time period, and the threshold must be determined according to the particular communication devices and network. For example, a 256 value representing the D.C. offset can be added to the linear samples of V.8 CM and V.8 JM before PCM compression. The receiver integrates the decompressed samples over the lengths of V.8 CM and V.8 JM to determine if the offset is present in the received signal. In an illustrative embodiment, the linear offset value may be added for a time period equal to the length of ANSam plus the length of V.8 JM. At the receiver, the received signal can be integrated for a time period the same time period of ANSam plus the length of V.8 JM.

The illustrative method can be embodied as a set of computer executable software instructions running on a high-speed Central Processing Unit ("CPU") and a memory system. In the preferred embodiment, a special-purpose digital signal processor ("DSP") is utilized, but it should be understood that a general-purpose processor may also be suitable in the present embodiment. The software instructions are executed as data bits by the CPU with an addressable computer memory system. It will be appreciated that any symbolically represented operations or acts described include the manipulation of electrical signals by the CPU. The electrical system represent data bits which cause a resulting transformation or reduction of the electrical signal representation, and the maintenance of data bits at memory locations in the memory system to thereby reconfigure or otherwise alter the CPU's operation, as well as other processing of signals. The memory locations where data bits are maintained also include physical locations that have particular electrical, magnetic, optical, or organic properties corresponding to the stored data bits.

The data bits may also be maintained on a computer readable medium including magnetic disks, optical disks, organic disks, and any other volatile or (e.g., Random Access memory ("RAM")) non-volatile (e.g., Read Only Memory ("ROM")) storage system readable by the CPU. The computer readable medium includes cooperating or interconnected computer readable media, which exist exclusively on a processing system or is distributed among multiple interconnected processing systems that may be local or remote to the processing system.

It should be understood that a hardware embodiment may take a variety of different forms. The hardware may be implemented as an integrated circuit with custom gate arrays or an application specific integrated circuit ("ASIC"). Of course, the embodiment may also be implemented with discrete hardware components and circuitry.

Figure 7:
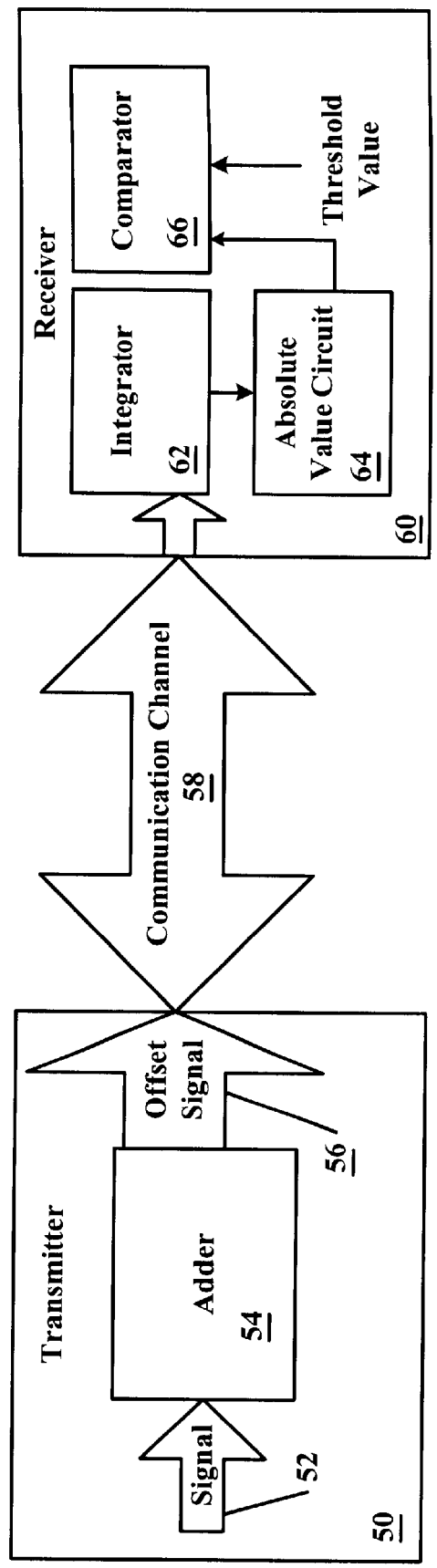
FIG. 7 shows a block diagram illustrating a hardware embodiment of the present invention.

Referring now to FIG. 7, shown is an illustrative hardware embodiment including a transmitter 50 and a receiver 60. The transmitter 50 or receiver 60 can be embodied in either an originating or answering communication device as depicted in FIGS. 1–3. Preferably, each communication device has both a receiver 50 and a transmitter 60.

The transmitter 50 includes an adder 54 for adding an offset component to a signal 52. In this illustrative embodiment, the transmitter adds a D.C. offset component to the signal 52 to form a signal 56 having a D.C. offset component as previously described. Offset signal 56 is transmitted across the communication channel 58 which may be a completely digital communication channel, a completely analog communication channel, ADPCM communication links and/or a combination of analog and digital communication links. The offset signal 56 enables the determination of whether the communication channel between the transmitter 50 and receiver 60 is an end-to-end digital connection or includes an intervening analog or ADPCM connection link.

The offset signal 56 is transmitted across the communication channel 58 and received by a receiver 60. The signal received by the receiver 60 may or may not have an D.C. offset component depending on the communication channel between the transmitter 50 and the receiver 60. To detect the presence of the offset component, the receiver 60 may include a number of components including an integrator 62, an absolute value circuit 64, and a comparator 66. The integrator 62 receives the signal from the communication network 58 and integrates the received signal over a period of time. The integrator 62 can be a 32-bit integrator as previously described. The time period can be determined by those skilled in the art according to the particular application as previously described above. The integrator 62 provides an output value according to the time period and the received signal. The output of the integrator 62 is provided to the absolute value circuit 64 to determine the absolute value of the integrator 62 output. The absolute value circuit 64 provides an output to the comparator 66 to compare the absolute value of the integrator output to a threshold value 68. The threshold value is selected such that if the absolute value of the integrator output exceeds the threshold level, the D.C. offset added by the transmitter 50 is present in the signal received from the communication channel 58. The presence of the D.C. offset in the received signal indicates that there are no intervening analog or ADPCM communication links in the communication channel between the transmitter and the receiver. Thus, the communication channel between the devices must be an all-digital end-to-end connection.

It should be understood that the described components might be embodied in a variety of ways and by different devices. Of course, the components may be realized by logic such as discrete components, combinational logic, exclusive-OR logic gates, shift registers, buffers, and associated hardware well known to those skilled in the art. The hardware may also be embodied as an integrated circuit such as a custom gate array, programmable logic device ("PLD"), application specific integrated circuit ("ASIC") together or apart from a microprocessor with associated RAM and ROM memory.

Using the embodiments described herein, analog communication and ADPCM links can be detected in a data communication channel. The described embodiments may be utilized between modems having an all-digital communication mode requiring an end-to-end digital communication channel such as the V.90 All-digital mode. The D.C. offset may be introduced in signals during V.8 CM and/or V.8 JM negotiation to eliminate any additional probing. The presence of any analog links can be detected before the end of the V.8 sequence so the device may proceed straight to an analog V.34 mode. Thus, early determination of the presence of an analog link allows the device to avoid extra sequences in attempting to set up the communication protocol before falling back to an analog mode such as V.34.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method of detecting an analog communication link in a communication channel comprising:
   transmitting a signal with an offset component across the communication channel, the offset component being a shift in a peak-to-peak amplitude of the signal;
   receiving the signal as a received signal; and
   detecting the absence of the offset component in the received signal;
   wherein the step of detecting the absence of the offset component in the received signal indicates the communication channel includes an analog link.

2. The method of claim 1 wherein the signal comprises sampled digital data.

3. The method of claim 1 wherein the signal comprises a pulse code modulated signal.

4. The method of claim 1 wherein the signal comprises adding a constant value to a signal to form the transmitted signal.

5. The method of claim 1 wherein the step of transmitting the signal comprises a portion of a ITU-T V.8 protocol sequence.

6. The method of claim 1 wherein the step of transmitting the signal comprises sending ITU-T ANSAM having an offset component.

7. The method of claim 1 wherein the step of transmitting the signal comprises sending ITU-T V.8 Call Menu having an offset component.

8. The method of claim 1 wherein the step of transmitting the signal comprises sending ITU-T V.8 Joint Menu having an offset component.

9. The method of claim 1 wherein the analog communication link comprises an ADPCM link.

10. The method of claim 1, the step of detecting the absence of the offset component in the received signal further comprising:
    integrating the received signal over a period of time;
    calculating the absolute value of the integrated signal; and
    comparing the absolute value of the integrated signal to a threshold value;
    wherein the threshold value exceeding the absolute value of the integrated circuit indicates the absence of the offset value in the received signal.

11. The method of claim 10 wherein the period of time is in accordance with the length of the ITU-T ANSam plus the Joint Menu time period of the answering modem.

12. The method of claim 10 wherein the period of time is in accordance with the length of the Call Menu time period of the originating modem.

13. A device for detecting an analog communication link in a communication channel comprising:
    a transmitter for transmitting a signal having an offset component across the communication channel, the offset component being a shift in a peak-to-peak amplitude of the signal,
    a receiver capable of receiving the signal from the communication channel; and
    detector logic capable of detecting the offset component in the received signal;
    wherein an analog link exists if the offset component is not detected in the received signal.

14. The device of claim 13 wherein the analog communication link is not present if the offset signal is detected in the received transmit signal.

15. The device of claim 13 wherein the device is a data modem.

16. The device of claim 13 wherein the device is a dual mode analog and digital data modem.

17. The device of claim 13 wherein the signal comprises part of an ITU-T V.8 protocol sequence.

18. The device of claim 17 wherein the detector logic detects the offset component before the approximately 75 msec period during which no signals are transmitted as part of the ITU-T V.8 sequence.

19. The device of claim 17 wherein the detector logic detects the offset component before the completion of the ITU-T V.8 sequence.

20. The device of claim 13 wherein the detector logic detects the offset component before the determination of which modulation to use is made.

21. The device of claim 13 wherein the transmit signal comprises an ITU-T ANSAM having an offset component.

22. The method of claim 13 wherein the transmit signal comprises sending ITU-T Call Menu having an offset component.

23. The method of claim 13 wherein the transmit signal comprises sending ITU-T Joint Menu comprising an offset component.

24. The device of claim 13 wherein the detector logic comprises a computer processing unit and memory with executable instructions.

25. The device of claim 13 wherein the detector logic comprises a programmable logic device.

26. The device of claim 13 wherein the detector logic further comprises:
    an integrator to receive the transmitted signal and output a value;
    an absolute value circuit to determine the absolute value of the integrator output value; and
    a comparator to compare the absolute value of the integrator output value to a threshold value;
    wherein the offset component is present if the absolute value of the transmitted signal is greater than a threshold value.

27. The device of claim 13 wherein the analog communication link comprises an ADPCM communication link.

28. The device of claim 26 wherein the offset component is not present if the absolute value of the transmitted signal is less than a threshold value.

29. Detector logic to detect the presence of an analog link in a communication channel comprising:
    an integrator to receive a transmitted signal and output a value corresponding to an offset component of the transmitted signal, the offset component being a shift in a peak-to-peak amplitude of the signal;

an absolute value circuit to determine the absolute value of the integrator output value; and a comparator to compare the absolute value of the integrator output value to a threshold value;

wherein an analog link is detected if the threshold value is less than the absolute value of the integrator output value.

30. A method of detecting an end-to-end digital communication channel comprising the steps of:

adding an offset value to a signal to form a transmit signal, the offset value being a shift in a peak-to-peak amplitude of the signal;

transmitting the transmitted signal comprising the offset value and the signal;

receiving the transmitted signal as a received signal; and detecting the offset value in the received signal;

wherein the detection of the offset value in the received signal indicates the presence of an end-to-end digital communication channel.

31. The method of claim 30 wherein the step of adding an offset value comprises adding a constant value to the signal.

32. The method of claim 30 wherein the signal comprises a PCM value and the step of adding an offset value comprises adding a constant PCM value to the signal.

33. The method of claim 30 wherein the absence of the offset signal indicates the presence of an analog link in the communication channel.

34. The method of claim 30 wherein the step of transmitting a signal comprises a portion of a V.8 protocol sequence.

35. A receiver for detecting an all-digital communication channel, comprising:

a signal transmitted across the communication channel, the signal being transmitted with a D.C. offset by a transmitter, the D.C. offset being a shift in a peak-to-peak amplitude of the signal;

a detector for receiving the signal and detecting the D.C. offset in the signal to determine whether the communication channel is a completely digital communication channel.

36. The receiver of claim 35 wherein the D.C. offset is added to an analog modulated signal.

37. The receiver of claim 35 wherein the receiver further comprises:

an integrator for integrating the signal, wherein the integrator provides an output in accordance with the signal;

an absolute value circuit for determining the absolute value of the output of the integrator; and a comparator for comparing the output of the absolute value circuit to a threshold value;

wherein the threshold value determines whether the communication channel is all digital.

* * * * *